E

(12) United States Patent  
Sathya et al.

(10) Patent No.: US 9,426,405 B2  
(45) Date of Patent: Aug. 23, 2016

(54) SYSTEM AND METHOD OF DETERMINING THE APPROPRIATE MIXING VOLUME FOR AN EVENT SOUND CORRESPONDING TO AN IMPACT RELATED EVENTS AND DETERMINING THE ENHANCED EVENT AUDIO

(76) Inventors: Vijay Sathya, Karnataka (IN); Priyank Saxena, Karnataka (IN); Murlidhar Skanda, Karnataka (IN)

( * ) Notice: Subject to any disclaimer, the term of this patent is extended or adjusted under 35 U.S.C. 154(b) by 1027 days.

(21) Appl. No.: 13/384,261

(22) PCT Filed: Jul. 15, 2010

(86) PCT No.: PCT/IB2010/053233  
§ 371 (c)(1),  
(2), (4) Date: Jan. 16, 2012

(87) PCT Pub. No.: WO2011/007330  
PCT Pub. Date: Jan. 20, 2011

(65) Prior Publication Data  
US 2012/0117063 A1     May 10, 2012

(30) Foreign Application Priority Data  
Jul. 15, 2009   (IN) .......................... 1676/CHE/2009

(51) Int. Cl.  
*H04B 1/00* (2006.01)  
*H04N 5/60* (2006.01)  
*H04S 7/00* (2006.01)  
*H04N 21/439* (2011.01)  
*H04R 27/00* (2006.01)

(52) U.S. Cl.  
CPC ............. *H04N 5/602* (2013.01); *H04N 21/439* (2013.01); *H04S 7/30* (2013.01); *H04R 27/00* (2013.01); *H04S 2400/13* (2013.01); *H04S 2400/15* (2013.01)

(58) Field of Classification Search  
USPC ............... 381/119, 104, 1, 2, 17, 18, 61, 303, 381/306, 307, 310; 707/736, E17.058  
See application file for complete search history.

(56) References Cited

U.S. PATENT DOCUMENTS

2007/0248327 A1   10/2007   Chen  
2008/0199154 A1   8/2008    Kanai et al.

FOREIGN PATENT DOCUMENTS

| EP | 1542206 A1 | 6/2005 |
| EP | 1847937 A1 | 10/2007 |
| JP | 2006/211174 A | 8/2006 |

OTHER PUBLICATIONS

The international publication WO2011/007330 and ISR dated Jan. 3, 2011.

*Primary Examiner* — Vivian Chin  
*Assistant Examiner* — Friedrich W Fahnert  
(74) *Attorney, Agent, or Firm* — Garcia-Zamor IP Law; Ruy M. Garcia-Zamor

(57) ABSTRACT

A system and method of determining the appropriate mixing volume corresponding to an impact related event is described herein. The instant invention facilitates determination of the appropriate mixing volume for the event sound corresponding to an impact related event in an related audio-video feed so as to account for the perceived visual proximity of the event and variations in the loudness of accompanying event audio, thereby enabling perfect mixing of event audio and event sound. The instant invention further discloses method/s of minimizing any unwarranted/drastic increase in the overall volume during the mixing process.

16 Claims, 10 Drawing Sheets

SYSTEM AND METHOD OF DETERMINING THE APPROPRIATE MIXING VOLUME FOR AN EVENT SOUND CORRESPONDING TO AN IMPACT RELATED EVENTS AND DETERMINING THE ENHANCED EVENT AUDIO

CROSS REFERENCE TO RELATED APPLICATION

This application claims priority to and benefit of each of the following: (1) PCT application PCT/IB2010/053233, filed Jul. 15, 2010; and (2) Indian Provisional Patent Application No. 1676/CHE/2009 filed on Jul. 15, 2009; each of the above cited applications is hereby incorporated by reference herein as if fully set forth in its entirety.

FIELD OF INVENTION

The present invention relates to system and method of determining the appropriate mixing volume corresponding to an impact related event.

More particularly the present invention relates to a system and method of determining the appropriate mixing volume corresponding to an impact related event wherein said event is an audio-video event.

More particularly the present invention relates to a system and method of determining the appropriate mixing volume corresponding to an impact related event wherein the event-sound mixing volume is proportional to the perceived proximity of said event.

More particularly the present invention relates to a system and method of determining the appropriate mixing volume corresponding to an impact related event wherein the event is already accompanied by some background audio.

More particularly the present invention relates to a system and method of determining the appropriate mixing volume corresponding to an event wherein there is no drastic and undesirable fluctuation in the overall audio volume due to event sound mixing.

BACKGROUND OF THE INVENTION

The Advent of HD (High Definition) has brought the spotlight on enhanced resolution and quality of the Video and Audio components of a broadcast signal or Audio Video Stream.

When it comes to Audio quality an important element is the intricate tapestry of sounds that accompanies the intensity and emotion of key impact related events, hereinafter impact events, perceived in the Visual. These sounds, referred to hereinafter as event sounds, are typically added from a sound effects library as part of the post production process for movies and other non-live media productions. In live production such as sporting events, an attempt is made to capture event sounds for key impact events (e.g., a football player kicking a ball), using microphones.

Ensuring the right mixing volume for the event sound is of great importance. Unlike ambience sounds which reflect the general ambience, event sounds serve to accentuate the audio-visual experience of impact events as seen in the visual and must be in close harmony with the visual dynamics of the impact event. This is therefore a significant challenge on two counts. Firstly, it is desirable that the volume must be harmonious with the visual proximity of the perceived impact event. Secondly, one has to account for background audio accompanying the impact event which can be present at varying loudness levels.

Current techniques for estimating the right mixing volume for event sounds is based on a manual mix and match approach which is cumbersome, time consuming and relies heavily on human expertise. The problem is exacerbated for live productions where, unlike in the case of post productions (e.g. Movies), the estimation of mixing volume for event sounds has to be instantaneous.

The instant invention therefore proposes a system and method to overcome the above-mentioned problems.

SUMMARY AND OBJECT OF THE INVENTION

A system and method of determining the appropriate mixing volume for an event sound corresponding to an impact related event is described herein. The instant invention facilitates determination of the appropriate mixing volume of the event sound for an impact related event in an audio-video feed in a manner so as to account for both the perceived visual proximity of the event and variations in the loudness of the background audio, hereinafter referred to as event audio. The mixing done thus yields an enhanced event audio which provides the user with the desired audio enhancement pertaining to the impact event. The instant invention further discloses method of reducing any undesirable increase in overall volume caused during the creation of the enhanced event audio thereby minimizing any irritant created during event sound mixing thus further improving the hearing experience of the viewer.

The object of the instant invention is to provide a system and method of determining the appropriate mixing volume corresponding to an impact related event.

Yet another object of the instant invention is to provide a system and method of determining the appropriate mixing volume corresponding to an impact related event wherein the event is an audio-video event.

Yet another object of the instant invention is to provide a system and method of determining the appropriate mixing volume corresponding to an impact related event wherein the event-sound mixing volume is proportional to the perceived proximity of the visual event Yet another object of the instant invention is to provide system and method of determining the appropriate mixing volume corresponding to an impact related event therein the event already has some background audio.

Yet another object of the instant invention is to provide a system and method of determining the appropriate mixing volume corresponding to an event wherein there is no drastic and undesirable fluctuation in the overall audio volume due to event sound mixing.

BRIEF DESCRIPTION OF ACCOMPANYING DRAWINGS

The features of this invention together with its objects and advantages thereof may be best understood by reference to the description taken in conjunction with the accompanying drawings.

FIG. 1 illustrates the system in one of its preferred embodiments.

FIG. 2 further illustrates the embodiments of the system in its preferred embodiments FIG. 3 illustrates a method to determine the appropriate mixing volume and the EEA in the preferred embodiments FIG. 4A illustrates a method to determine the size of event object in the impact-frame in the preferred embodiments.

DESCRIPTION OF THE PREFERRED EMBODIMENT

While describing the preferred embodiments of the instant invention following terms shall be used:

Impact Event: An audio visual event featuring the collision/contact of one or more objects in such manner to generate an audible sound (or expectancy of hearing a sound). Examples of impact events include: a player kicking a football in a televised football game Impact Frame: The Video frame where the impact event is deemed to have occurred Event Sound (ES): Refers to the sound emanating from and due to an impact event. The event sound may be either captured at the creating of the audio-visual event, or else, added on later from an external source such as sound effects library.

Event Object: The object involved in the impact-event and responsible for generation of the Event Sound Event Audio (EA): Refers to the Event Audio accompanying an impact event. The Event Audio is simply a predefined length of the Audio Track accompanying the Impact frame.

Intermediate Mixing Volume: Refers to volume at which the Event sound is to be mixed into the event audio. This volume level refers to the volume level before the threshold is applied.

Mixing Volume: This refers to the final volume calculated after max threshold is applied and is multiplied to the ES.

Scaled Event Sound: This refers to the Event sound which is multiplied by the mixing volume level.

Intermediate Enhanced Event Audio (IEEA): The result of mixing the event audio and Scaled Event sound.

Enhanced Event Audio (EEA): This is obtained by subjecting the IEEA to envelope thresholding.

Reference will now be made with reference to the accompanying drawings.

Figure 1:
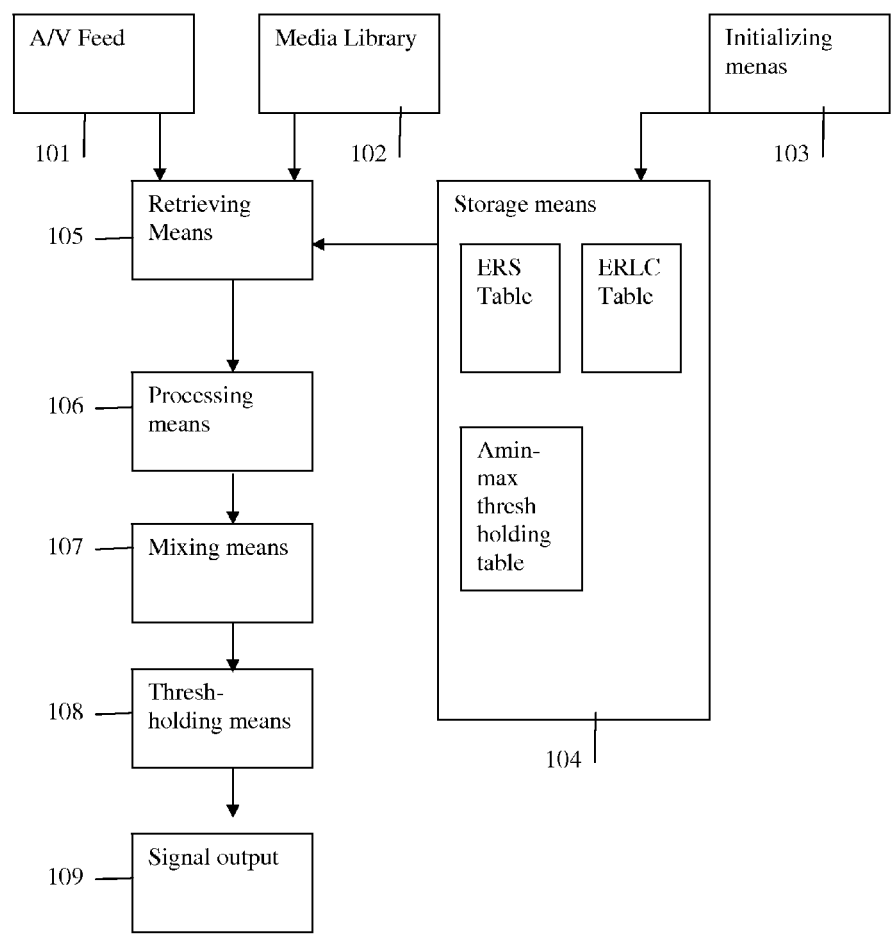
Figure 2:
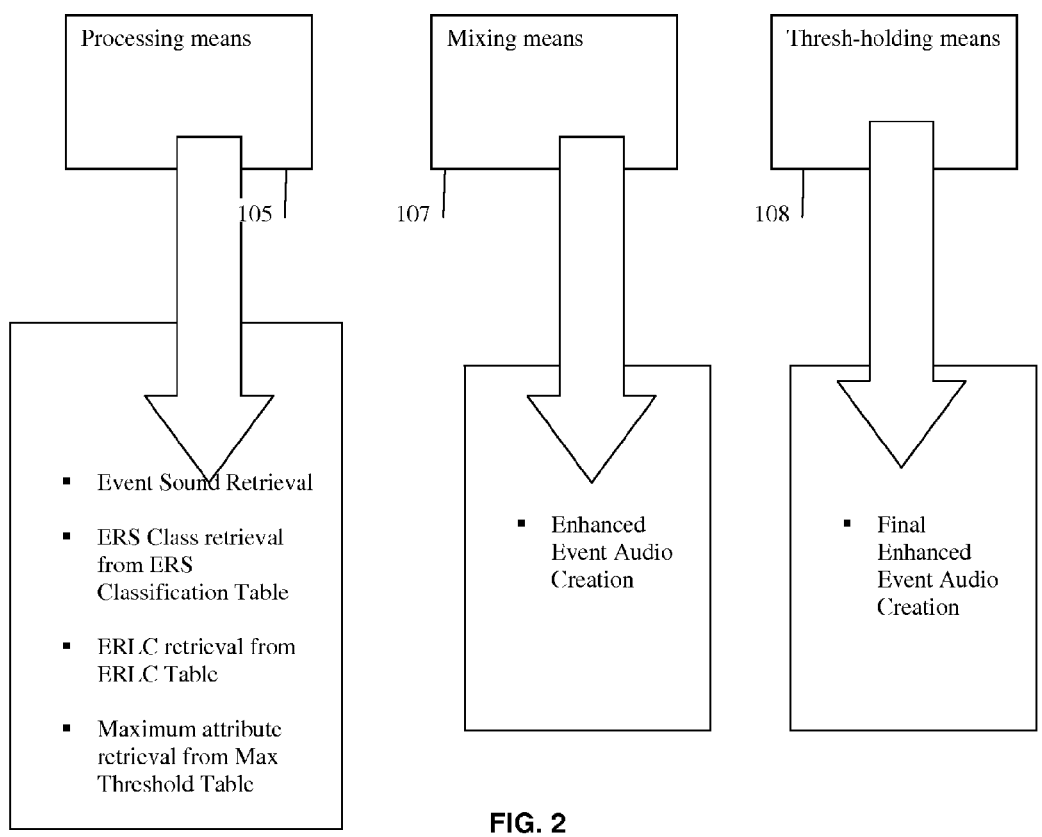
Figure 3:
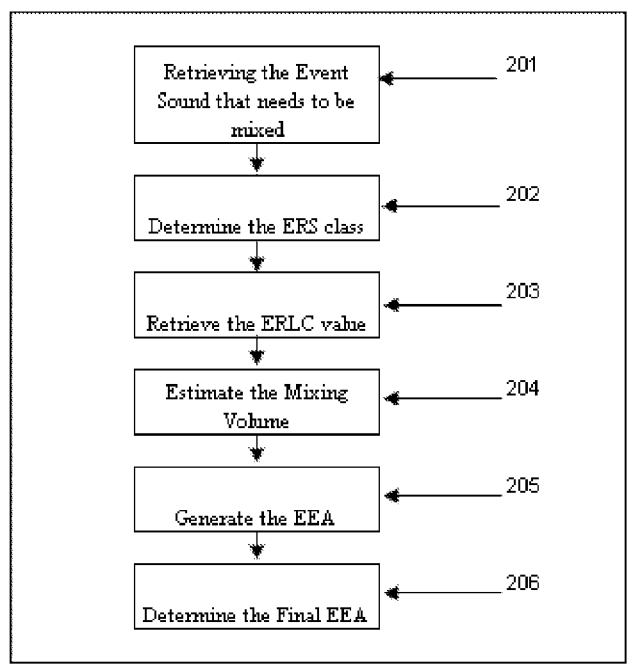
Figure 4A:
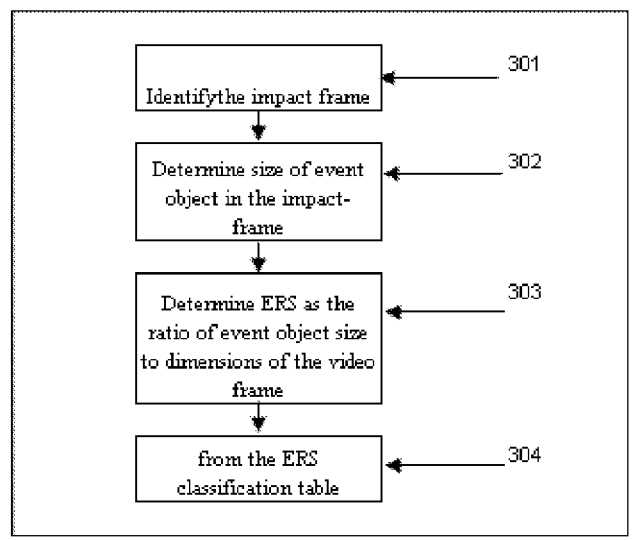
FIG. 4B illustrates a method to create the ERS table in the preferred embodiments.
Figure 4B:
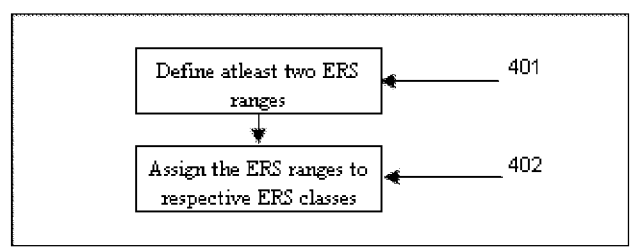
Figure 5:
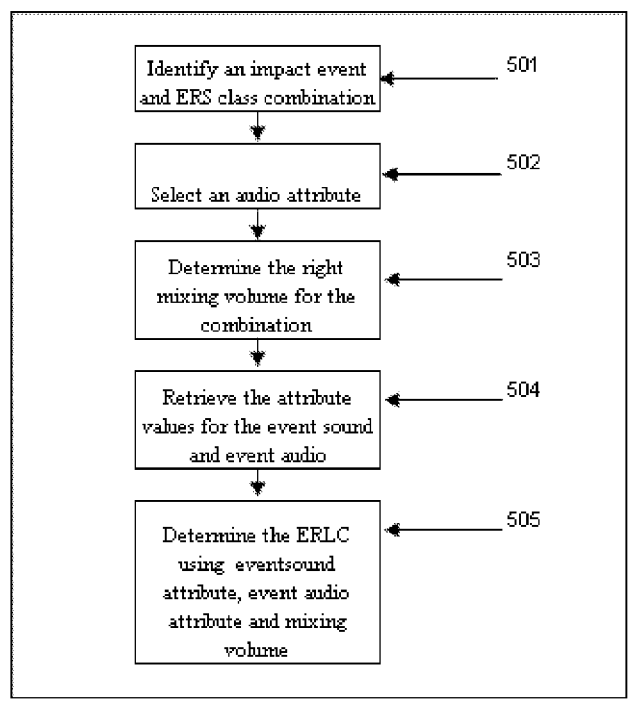
FIG. 5 illustrates a method to determine the ERLC value.
Figure 6:
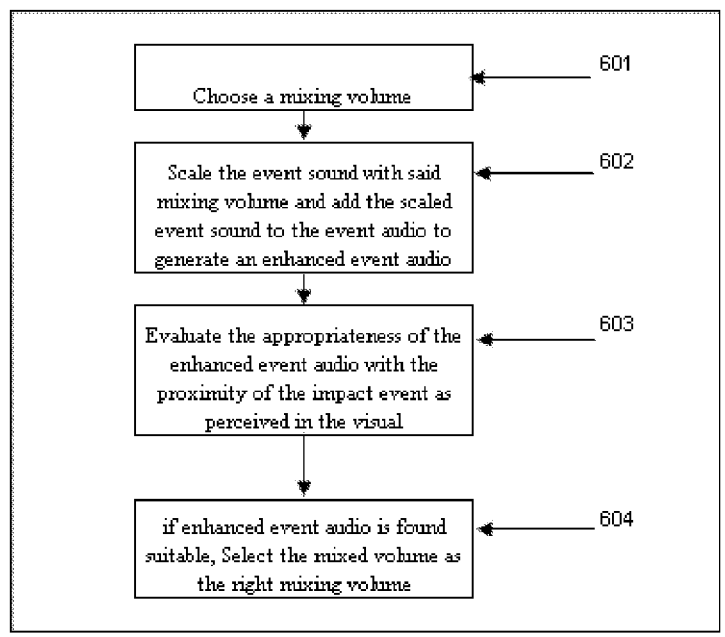
FIG. 6 illustrates a method to determine the right intermediate mixing volume
Figure 7:
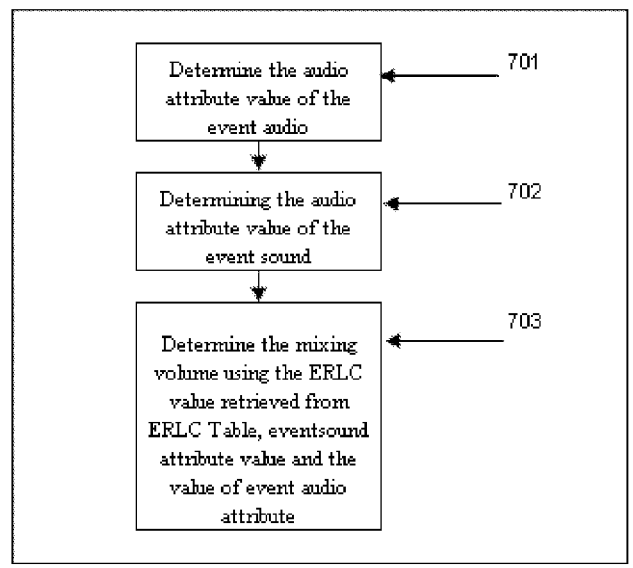
FIG. 7 illustrates a method to estimate the mixing volume
Figure 8:
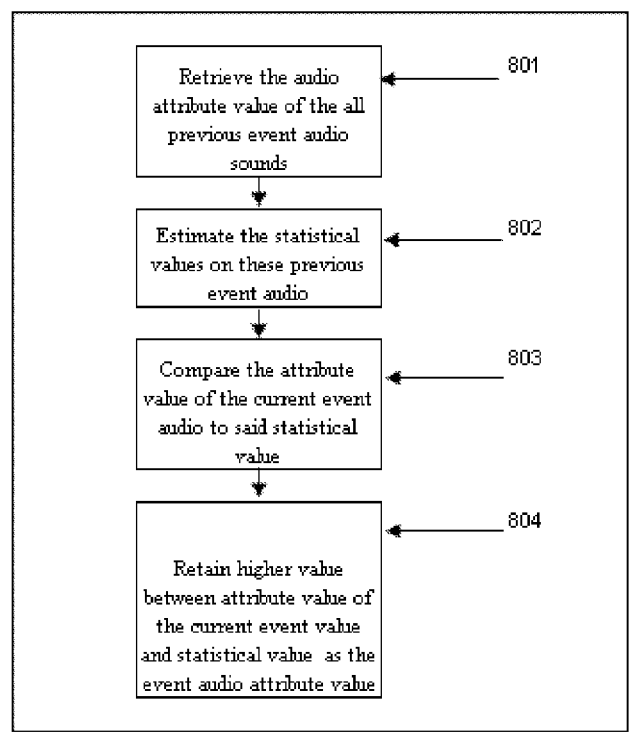
FIG. 8 illustrates a method to determine the event audio attribute
Figure 9:
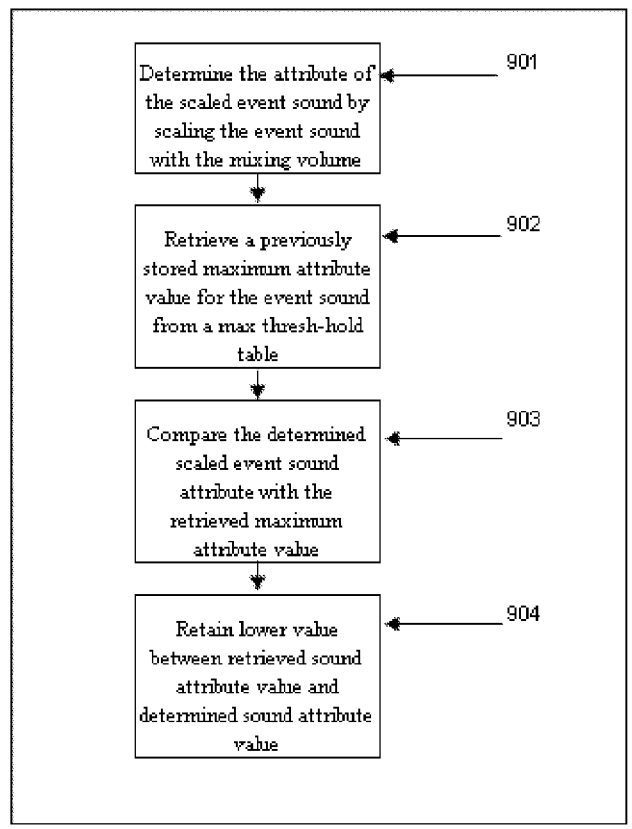
FIG. 9 illustrates a method to determine the mixing volume
Figure 10:
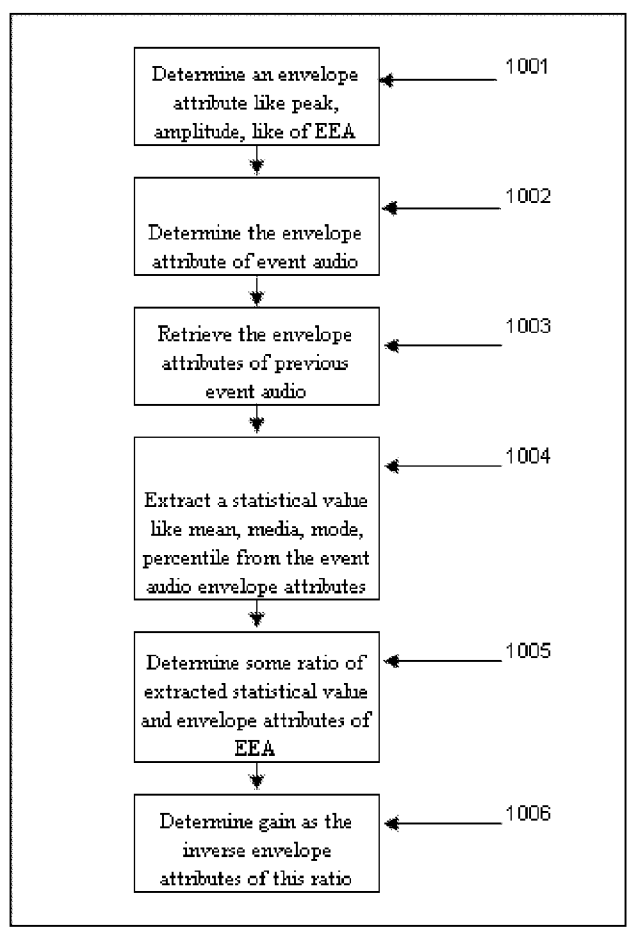
FIG. 10 illustrates a method to determine the gain value

In one of the preferred embodiments of the instant invention as shown in FIG. 1, 2, . . . , 10, in order to determine the most appropriate volume for an impact related event, the system first creates a volume Management Library composed of three tables as described below.

ERS Classification Table: The ERS (Event Relative Size) of the event-object is calculated as the ratio of the size of the event-object to the size of the video-frame. The ERS calculated thus helps quantify the visual proximity of an impact-event as perceived in an audio-visual presentation (the video frames). Suppose the event-object, as shown in the audio-visual presentation is large (due to close shot), the ERS would be more. Therefore ERS plays a vital role in determining the appropriate mixing volume applied to event-sound used for generating the Enhanced Event Audio for the impact-event.

a. An ERS Class table is where all potential & feasible ERS values for event-objects are classified under two or more ERS classes (e.g., Close, Long) and stored with the corresponding ERS range values. The ERS Class Table thus generated is generic in nature and fully agnostic to the type of impact-event and event-object ERLC Table: For a given impact-event and ERS class, the "Event Relative Loudness Constant" or "ERLC" is calculated as follows. First the right mixing volume is estimated through empirical mixing trials for Multiple instances of that impact-event & ERS class combination, where each instance is referred to henceforth as a sample. Each sample features a different Event-Audio & Event-Sound that are plausible for the impact-event. Next an "Event Relative Loudness Constant" or "ERLC", value for each sample/instance (ERLC $_{(sample)}$) is calculated using a suitable attribute (e.g., signal energy, and like) of the Event-Audio and the Event-Sound, referred to henceforth as Attribute, along with the Mixing Volume of event-sound used for that sample/instance as described by the following equation:

$$ERLC_{(sample)} = \frac{EventSoundAttribute_{(sample)} \times MixingVolume_{(sample)}}{EventAudioAttribute_{(sample)}}$$

a. ERLC values obtained are almost constant across samples. There is however a small variability in the ERLC values emanating from the variability in ERS values across samples. The ERLC is therefore estimated by a statistical inference from across the ERLC (sample) values and expressed in the form of a statistical measure such as minimum, maximum, average etc.

b. The ERLC table is created by storing the statistical measures of ERLC for each of desired Impact-Event and ERS combinations. The ERLC Class Table thus generated has ERLC values that are specific to combinations of Impact-Event and ERS class.

Max Threshold Table: The Max threshold for a given impact-event and ERS class is calculated as follows. Multiple Experiments are conducted to empirically determine the maximum volume for a given impact-event and ERS class. This maximum volume is the defined as the max value of volume after which the event sound is perceived as distorted. Then the various attributes of an event sound at this maximum volume is determined.

a. The maximum threshold signifies the maximum level to which the event sound can be scaled without making it sound distorted. This is especially significant if the Event Audio is inherently very noisy. Consider an event audio of a football match in which a goal has been just scored. At this time the crowd would be screaming and the noise level would be very high. In spite of this noisy event audio it must be ensured that the event sound does not exceed a certain limit and sound remains undistorted. Therefore Max threshold plays a vital role in determining the maximum limit of the mixing volume applied to event-sound used for generating the Enhanced Event Audio.

b. The max threshold table is created by storing the max threshold values for all desired Impact-Event and ERS combinations in various rows. The max threshold table is thus specific to an ERS and impact-event combination For a given Audio-Video feed where an impact-event requiring Event Sound enhancement has been detected and where the Event Sound to be used has been isolated, the system proceeds to calculate the mixing volume to be used in the creation of the enhanced Event Audio as described below.

The system first identifies the exact frame where the impact-event occurred and the Event Sound needs to be inserted (301). This frame/s, referred to as the impact-frame, is where the event-objects are purported to emanate an impact related sound (which is either missing or feeble). Say for example in an audio-video broadcast feed of a football match this could be a kick by the player. Then the event-object is located in this frame. In the example mentioned the event object would be the football.

Once the event-object has been isolated, the ERS is calculated and the corresponding ERS class is identified by mapping it with values stored in the ERS Class Table.

Using the ERS Class the system then determines the Event Relative Loudness Constant (ERLC) for the Impact-event from the "ERLC Table".

Next the system isolates the Event Audio for the Impact-event. The system then calculates the Event Audio Volume Attribute. However, this can be misleading because there can be drastic changes in the nature of the Event Audio. For example, the crowd can suddenly go silent in a football game and this can result in an EventAudioAttribute which is too and not representative. Therefore a minimum thresholding is applied through statistical inferences of the Event Audio prior to the event. For example, the Median/$25^{th}$ percentile etc value of the EventAudioAttribute for all prior ImpactEvents in the concerned audiovisual presentation can be used as a minimum value. This ensures that the EventAudioAttribute is representative.

The system thereafter calculates the EventSoundAttribute for the EventSound to be applied.

Finally the system calculates the mixing volume as follows:

$$IntermediateMixingVolume = \frac{ERLC \times BackgroundAudioAttribute}{EventSoundAttribute}$$

The system then applies a maximum thresholding to the Intermediate mixing Volume at two different levels.

The first level of Max thresholding is done prior to the creation of the Enhanced Event Audio and using the Max Threshold Table. This is done by comparing a sound attribute calculated after applying the intermediate mixing volume and the maximum attribute stored in the Max Threshold Table. The mixing volume is then calculated using the lower of the two attribute values compared.

The second level of Max thresholding is done after the creation of the Enhanced Event Audio. Once the Event Audio has been mixed with the Event Sound to create the Enhanced Event Audio the overall loudness of the newly created EEA may be exceed certain acceptable limits thereby creating an unpleasant experience for the user.

To understand the problem lets consider the process of EEA generation $$EEA=EA+vol*ES$$

One may notice that the resulting EEA have higher bigger waves (sine curves) as we enhance the Event sound volume.

The resulting signal, IEEA, has overall high amplitude compared to the original signal, EA. Due to the higher amplitude the perceptible loudness of IEEA, determined by RMS or any such normalizing method, will be higher than the perceptible loudness of EA. In the case of events where the volume is determined to be high, such difference could be significantly high. This high overall difference may distort the final audio while encoding, while transmission, while decoding or while playing-out. Even if there is no signal distortion in the previous processes the high volume would create an unpleasant user experience because of the sudden temporal change in the loudness.

To overcome this problem a reduction in gain is applied to the signal resulted above, thus:

$$EEA=gain*(EA+mixing\,vol*ES)$$

The approaches and procedure to determine the gain could be one of the following based on either maximum-amplitude (peak signal value) and/or Loudness (rms value)

The maximum amplitude of the EEA is same as the maximum amplitude of the EA: To achieve this, maximum absolute amplitudes of the EA used and IEEA obtained is determined. The inverse ratio of these maximum amplitudes is then used as the gain to be applied in determining EEA.

The maximum loudness of the EEA is same as the maximum loudness of the EA: The gain is calculated by doing an inverse calculation on this loudness value.

The maximum loudness of the IEEA is statistically correlated to the maximum loudness of the EA:

Next, the target maximum EEA loudness is determined using a statistical function on the LA loudness. This statistical function is in terms of either, percentile, mean, median etc.

Once the target maximum EEA loudness is identified the gain is calculated by doing an inverse calculation on this loudness value.

The maximum loudness of the IEEA is statistically correlated to the maximum loudness of all the historical EAs:

A database of the all the historical loudness of the EA is maintained in the database.

For every new event the database is updated,

Next, the target maximum EEA loudness is determined using a statistical function on the database. This statistical function is in terms of either, percentile, mean, median etc.

Once the target maximum EEA loudness is identified the gain is calculated by doing an inverse calculation on this loudness value.

The system therefore proposes a method which not only helps reduce the time and effort while editing and mixing, it also helps provide error free results. Accordingly the ERL is determined for different classes and preserved in the library.

The system is therefore a boon to the audio-video mixing industry. It is also very useful for industry where requirement of the mixing of audio and video is instant The instant invention in its preferred embodiment may be applied in almost all audio-video events Consider an audio-video broadcast feed for a game of football where a player kicks the ball. This can be considered an impact-event. Here the ball is the event-object and the event-type is kick. Consider that the video feed is a close-up shot from the field camera. Based on the ball-size w.r.t. the full frame-size the ERS is calculated to be 0.1087 and the ERS-class is determined to be Close based on the ERS Classification Table.

Now, the ERS-class being close, the ERLC is determined to be 1.2 from the corresponding record (for combination kick-close) in the ERLC Table. The attribute value for the Event Audio and Event Sound is determined to be 11.34 and 3.67 respectively. Further the attribute value for Event Audio is found to be higher than the median of the all the previous Event Audio attribute values and hence is retained. The approximate ES intermediate mixing volume is calculated (using the attribute values and the ERLC) to be 11.423. From the Max Thresholding Table we find that the maximum allowed value for the event sound attribute is 10.56. Hence the mixing volume is then determined to be 10.56.

Now, the ES is scaled at the volume of 10.56 and mixed with EA to create IEEA. The loudness of this IEEA is then calculated to be 14.12. The 90th percentile of all the previous EA loudness is found to be 13.13. This is lower than the loudness of the IEEA. By taking the square root of the ratio of 13.13/14.12 we get the gain value as 0.96431. Hence IEEA is scaled by a gain of 0.96431. The resulting EEA now has a loudness of 13.13.

This EEA is now Enhanced Event Audio for the particular impact-event.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. For example in a audio-video presentation the foreground audio becomes the event and the event becomes the foreground, the system automatically adapts to predict the mixing volume of these events accordingly. Other modifications are apparent.

The invention claimed is:

1. A method of determining an appropriate mixing volume for an event sound corresponding to an impact related event and determining an enhanced event audio, the method comprising the steps of:
   retrieving the event sound that needs to be mixed,
   retrieving an event relative size class corresponding to a ratio of a size of an event object to a second size of an impact-frame, the event relative size class retrieved from an event relative size classification table,
   retrieving an event relative loudness constant value for the impact related event using the event relative size class and an impact event type, wherein the event relative loudness constant value is retrieved from an event relative loudness constant table,
   generating an enhanced event audio by mixing the event audio with the event sound, wherein the volume of the event sound is determined by a formula:
   event relative loudness constant value multiplied by a background audio attribute divided by an event sound attribute.

2. The method as claimed in claim 1, wherein the event sound that needs to be mixed is obtained either from a current Audio/Video broadcast data or through a media library.

3. The method as claimed in claim 1, wherein the step of retrieving the event relative size class further comprises the steps of:
   identifying the impact-frame,
   determining the size of the event object in the impact-frame,
   determining an event relative size as the ratio of the size of the event object to the second size of the impact-frame,
   retrieving the event relative size class from the event relative size classification table.

4. The method as claimed in claim 3, wherein creating the event relative size classification table further comprises the steps of:
   defining at least two event relative size ranges; and
   assigning the at least two event relative size ranges to respective event relative size classes.

5. The method as claimed in claim 1, wherein the step of retrieving the event relative loudness constant value further comprising the step of:
   using the event relative size class and the impact event type to retrieve a corresponding event relative loudness constant value from the event relative loudness constant table.

6. The method as claimed in claim 5, wherein creating the event relative loudness constant table further comprising the steps of:
   creating data sets for multiple trials for each of the event relative size class and impact event type combinations,
   determining the event relative loudness constant values for each trial, and
   storing a minimum, a maximum, an average and other statistical values of the event relative loudness constant for each event relative size class and impact event type combination.

7. The method as claimed in claim 6, wherein creating the dataset for multiple trials comprise steps of:
   selecting a set of plausible event sounds and event audio sounds that goes with the impact event type,
   using each permutation-combinations of the set as a dataset for a trial.

8. The method as claimed in claim 6, wherein the step of determining the event relative loudness constant value for each trial further comprises the steps of:
   identifying the impact event type and event relative size class combination,
   selecting an audio attribute,
   determining the right mixing volume for the combination,
   retrieving the attribute values for the event sound and event audio used in the trial; and
   determining the event relative loudness constant using the event sound attribute, the event audio attribute and the mixing volume used in the trial.

9. The method as claimed in claim 8, wherein the step of determining the right mixing volume further comprises steps of:
   choosing a mixing volume,
   scaling the event sound with said mixing volume and adding the scaled event sound to the event audio to generate the enhanced event audio evaluating the appropriateness of the enhanced event audio with a proximity of the impact related event as perceived visually; and
   selecting the mixing volume as the right mixing volume if the enhanced event audio is found suitable.

10. The method as claimed in claim 1, wherein the step estimating the appropriate mixing volume further comprises steps of:
    determining an audio attribute value of the event audio;
    determining a second audio attribute value of the event sound;
    determining the intermediate mixing volume using the event relative loudness constant value retrieved from an event relative loudness constant table, the second audio attribute value and the audio attribute value,
    determining the appropriate mixing volume.

11. The method as claimed in claim 10, wherein the method of determining the audio attribute value further comprises the steps of:
    retrieving the audio attribute value of all previous event audio sounds;
    estimating a statistical value, the statistical value being at least one of a mean, a median and a mode, comparing the audio attribute value of the current event audio to said statistical value; and
    retaining higher value between the attribute value of the current event value and the statistical value as the audio attribute value.

12. The method as claimed in claim 10, wherein the step of determining the appropriate mixing volume comprising steps of:
    determining an attribute of a scaled event sound by scaling the event sound with the intermediate mixing volume,
    retrieving a previously stored maximum attribute value for the event sound from a max thresh-hold table,
    comparing the attribute of the scaled event sound with the previously stored maximum attribute value; and retaining lower value between the attribute of the scaled event sound and the previously stored maximum attribute value;

determining the appropriate mixing volume using the retained value.

13. The method as claimed in claim 1, wherein the step of generating the intermediate enhanced event audio further comprises the steps of:

scaling the event sound by the appropriate mixing volume; and mixing the event audio with the scaled event sound.

14. The method as claimed in claim 1, wherein the step of determining the enhanced event audio further comprises the steps of:

comparing an intermediate enhanced event audio attribute with an event audio attribute;

modifying the intermediate enhanced event audio by scaling it with a gain value if the intermediate enhanced event audio attribute is more than the event audio attribute.

15. The method as claimed in claim 14, wherein determining the gain value comprises steps of:

determining an envelope attribute of the intermediate enhanced event audio, the envelope attribute being at least one of a peak and an amplitude, determining the envelope attribute of event audio, retrieving previous event audio envelope attributes;

extracting a statistical value from the previous event audio envelope attributes, the statistical value being at least one of a mean, a median, and a mode;

determining some ratio of the statistical value and the envelope attributes of the intermediate enhanced event audio, and determining the gain value as the inverse envelope attributes of this ratio.

16. The method as claimed in claim 8, wherein the audio attributes are at least one of a signal energy, a mean signal energy, and a root mean square.

\* \* \* \* \*